L. ATWOOD.
CLUTCH.
APPLICATION FILED MAY 11, 1907.
923,613.
Patented June 1, 1909.
2 SHEETS—SHEET 1.
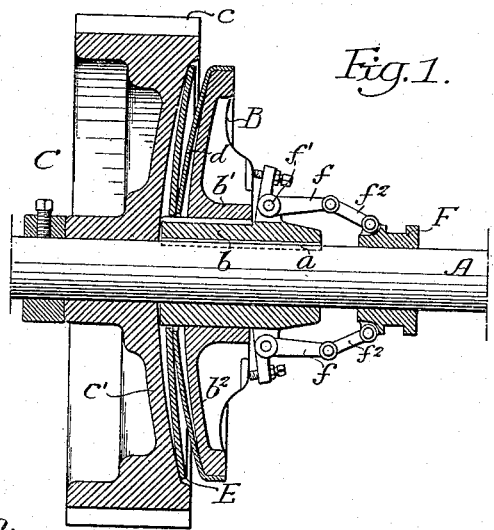
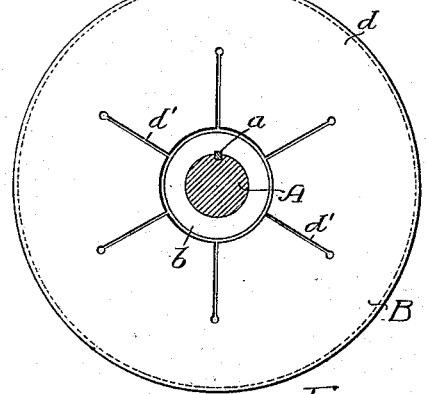
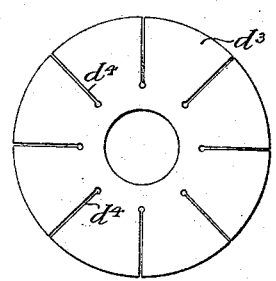
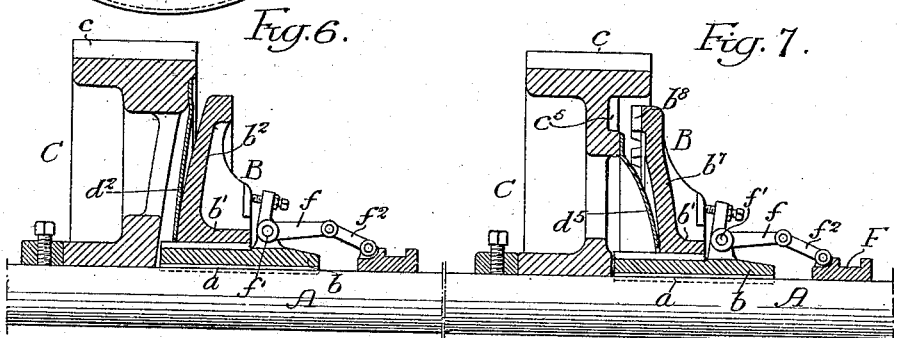
Witnesses:
Walter P. Pullinger
Augustus B. Coppes
Inventor
Leonard Atwood.
by his Attorneys,
Howson & Howson

L. ATWOOD.
CLUTCH.
APPLICATION FILED MAY 11, 1907.

923,613.

Patented June 1, 1909.
2 SHEETS—SHEET 2.

Witnesses:
Walter F. Pullinger
Augustus B. Coppes

Inventor:
Leonard Atwood.
by his Attorneys,
Howson & Howson

THE NORRIS PETERS CO., WASHINGTON, D. C.

12# UNITED STATES PATENT OFFICE.

LEONARD ATWOOD, OF PHILADELPHIA, PENNSYLVANIA, ASSIGNOR OF ONE-HALF TO ALBERT L. REGISTER, OF ARDMORE, PENNSYLVANIA.

CLUTCH.

No. 923,613.  Specification of Letters Patent.  Patented June 1, 1909.

Application filed May 11, 1907. Serial No. 373,087.

*To all whom it may concern:*

Be it known that I, LEONARD ATWOOD, a citizen of the United States, residing in Philadelphia, Pennsylvania, have invented certain Improvements in Clutches, of which the following is a specification.

Figure 2:
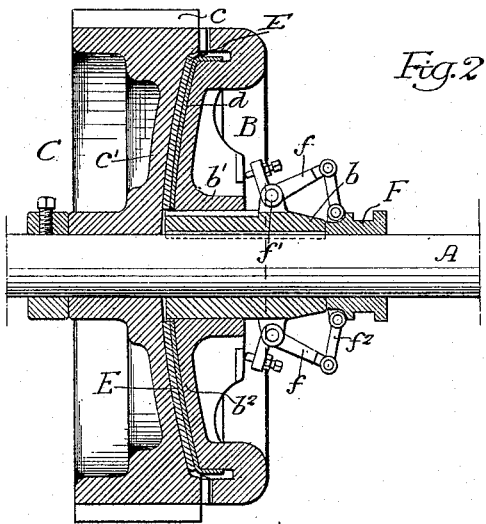
Figure 3:
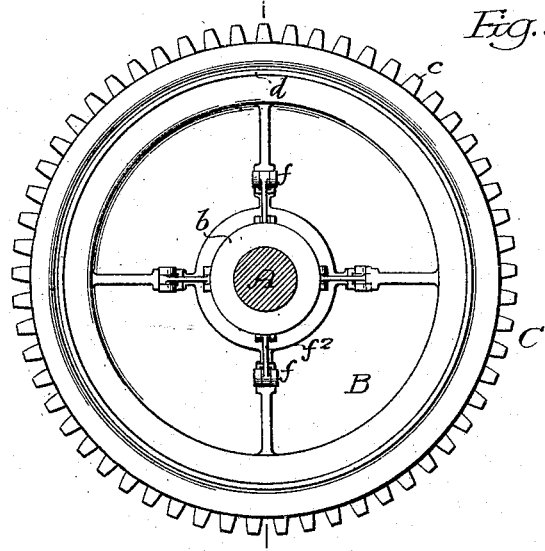
Figure 8:
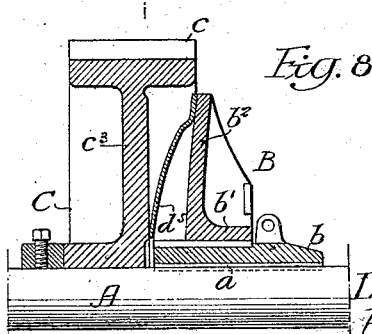

The object of my invention is to provide a clutch of such construction and arrangement of parts that the frictional area shall increase as the pressure forcing the clutch members together is increased. This object I accomplish in the following manner, reference being had to the accompanying drawings, in which:

Figure 1, is a longitudinal sectional view of my improved clutch, showing the two frictional faces in the positions occupied when very slight pressure is applied, or when the parts are operatively disconnected. Fig. 2, is a view similar to Fig. 1, illustrating a slightly modified form of my invention and showing its parts in the positions occupied when extreme pressure is applied, or when parts of the clutch are operatively coupled. Fig. 3, is an end elevation further illustrating the clutch shown in Figs. 1 and 2; Fig. 4, is a vertical section showing in detail the spring disk or friction plate; Fig. 5, is a view showing a modified form of the friction plate, and Figs. 6, 7, and 8 are modifications of my invention.

In the above drawings, A is a shaft on which are mounted the two parts or members B and C and in the present instance, the hub portion $b$ of the part B is secured to the shaft A by a key $a$ or other suitable means, while the part C is loose on said shaft though free to rotate with the same when the friction surfaces are in contact.

On the periphery of the part C in the present instance, is a series of gear teeth $c$, but this part may be secured to a belt wheel, or gear wheel, or may be an integral part of a belt wheel without departing from my invention.

In Figs. 1 to 4 inclusive, a concave friction plate is secured to, and in the present case forms a part of, the section C, serving also as the web of the structure supporting the teeth $c$. Splined on the hub $b$ of the section B is a sliding ring $b'$ which in the present instance has a convex flange $b^2$ carrying a convex disk $d$ of spring material. The concavity of the web or friction surface $c'$ is less than the convexity of the disk $d$ so that when they are moved together they will contact first at the center, and as pressure is applied said disk $d$ will yield sufficiently to bring a greater area of the surfaces into contact, until when extreme pressure is applied and the parts occupy the position shown in Fig. 2, the entire surface of said disk $d$ is in contact with the entire surface of the web $c'$. Thus, as the pressure is increased, the frictional contact is increased until the parts of the device are fully engaged with each other.

In the clutch shown in Figs. 1 and 2, I have shown a preferably flexible washer or intermediate disk E which may be of any suitable friction material for preventing direct contact of the surfaces of the parts $d$ and $c'$ as well as for causing the parts to be more strongly held together. It will be understood that the two surfaces may be brought into contact by any suitable mechanism, such as levers, screws, or other devices commonly used in clutch construction.

In Figs. 1 to 3, of the drawings, I have shown levers $f$—$f$ pivoted at $f'$ to the hub and the short arms of these levers rest against the sliding ring part $b'$ of the portion B. The long arms of the levers are connected by links $f^2$ to a sliding sleeve F controlled by a shifting lever so that in operating the lever the two parts of the clutch can be brought into contact with any pressure desired.

It will be understood that while I have shown but one form of mechanism for moving one member of the clutch toward and from the other, other devices may be used without departing from my invention.

From Fig. 4, it will be noted that the spring disk $d$ is preferably provided with radial slots $d'$ extending outwardly for a distance from the central opening of the disk so as to best permit of the operation of the various parts as described above.

In Fig. 6, I have shown the slidable member of the clutch made as described in connection with Figs. 1 and 2 but provided with a disk $d^2$ of spring material, which, in this case, is held at its periphery to the part C.

If desired I may make the spring disk as indicated in Fig. 5 with radial slots $d^4$ extending inwardly from the circumference toward the center. The great advantage of this slotted construction lies in the fact that the spring disks may be made of much heavier material than if they were omitted.

In Fig. 8, the sliding member of the clutch is shaped as shown in Figs. 1 and 2, while the member C has its web provided with a plane surface adjacent to said slidable member. Between said two members is provided a convex spring disk $d^5$ connected at its periphery to the periphery of the convex portion $b^2$, and when the members of the clutch are operatively disconnected this disk engages the web of the member B near the shaft A.

In Fig. 7, the member C has connected to it a convex disk $d^5$ like that shown in Fig. 8, which is held to or engages said member at its periphery. In this case, the sliding member B of the clutch is made concave relatively to the said spring disk, as indicated at $b^7$ so as to be engaged by said disk adjacent to the center thereof. In this particular instance, I provide the outer portion of the sliding member with a series of teeth $b^8$ and some distance from the center of the shaft A I also form on the member C a second series of teeth $c^5$ so as to be engaged by the teeth $b^8$ when the two members of the clutch are coupled together.

Under operating conditions when the sleeve F is moved toward the sliding member of the clutch, the part $b^7$ of this latter engages with the spring disk $d^5$ over only a relatively small area immediately adjacent to the center thereof. As, however, it is forced farther toward said member, the respective areas of the parts $b^7$ and $d^5$ in contact increase, until when the clutch members are coupled so as to revolve in unison the teeth $b^8$ engage with the teeth $c^5$ and positively connect the two parts together.

It is obvious that the various forms of my clutch illustrated in Figs. 1, 6, 7 and 8 may be provided with teeth similar to those illustrated at $b^8$ and $c^5$ without departing from my invention.

While I may as described above, omit the washer E from the clutch, it is preferably used in many cases and is of flexible material. As shown in Fig. 1, when employed between two surfaces—one concave and the other convex—I preferably secure it to the convex surface, making it sufficiently heavy to allow it to first contact at its periphery with the concave surface. Then as the two parts of the clutch are drawn together, the area of the surfaces in contact will increase as the washer is flexed until it conforms to the shape of the parts of the opposing clutch members.

I claim:

1. The combination in a friction clutch of two parts having differently curved frictional surfaces, means for moving one part toward the other to bring said surfaces together, with a flexible washer mounted between the two surfaces, substantially as described.

2. The combination in a friction clutch, of two parts having differently curved frictional surfaces, of which one surface is provided by a flexible spring plate, means for moving one part toward the other to bring said surfaces together, with a flexible washer mounted between the two surfaces, substantially as described.

3. The combination in a friction clutch of two parts having differently curved disk shaped frictional surfaces, with means for bringing the two surfaces into frictional contact so that as pressure is applied the area of contact will be increased, and means for positively coupling the clutch members after said two surfaces have been brought into frictional contact, substantially as described.

4. The combination in a friction clutch, of two parts, one movable in respect to the other, a concave frictional surface on one part, a convex frictional surface on the other part, the parts being so proportioned that the concavity of one is out of line with the convexity of the other, so that when the two parts are brought into contact as pressure is applied the area of frictional contact will be increased, with a flexible washer interposed between said two surfaces, substantially as described.

5. The combination in a friction clutch, of two sections, of which one is movable in respect to the other, a concave frictional surface on one section, a convex frictional surface on the other section, the depth of the concave surface being less than the projection of the convex surface of the other section, and means for moving the two sections together, the said surfaces being constructed to first come in contact at a point adjacent to the center of rotation of the clutch, and as pressure is applied increase their area of contact toward the periphery, substantially as described.

6. The combination in a clutch, of a shaft, two sections mounted on the shaft, the hub of one section being secured to the shaft, a ring carried by said hub, a convex relatively flat disk carried by the ring and forming a friction surface, the other section of the clutch being loose on the shaft, a concave disk secured to said section, the friction surface of the disk being out of line with the friction surface of the other disk, with means for moving the ring with the convex surface toward the section carrying the concave surface, substantially as described.

7. A clutch having two members and including a relatively flat plate of spring material, one of the parts having a surface of a curvature different from that of said plate, and means for forcing the members together to operatively couple them, the face of said plate being placed to co-act with the curved surface of the other member and being formed to increase its area of contact therewith from the center outwardly as the clutch members are brought together.

8. A clutch having two members and including a relatively flat plate of spring material, one of the members having a surface of a shape different from that of said plate, and means for forcing the members together to operatively couple them, the face of said plate being placed to co-act with said surface and being formed to increase its area of contact therewith from the center outwardly as the clutch members are brought together, there being radial slots in said plate.

In testimony whereof, I have signed my name to this specification, in the presence of two subscribing witnesses.

LEONARD ATWOOD.

Witnesses:
 WM. A. BARR,
 JOS. H. KLEIN.